United States Patent [19]

Zelle

[11] 4,024,710

[45] May 24, 1977

[54] LOAD SENSING HYDRAULIC CIRCUIT HAVING POWER MATCHING MEANS

[75] Inventor: Lester L. Zelle, Waverly, Iowa

[73] Assignee: Koehring Company, Milwaukee, Wis.

[22] Filed: Mar. 25, 1976

[21] Appl. No.: 670,151

[52] U.S. Cl. .................................. 60/420; 60/422; 60/428; 60/449; 60/484; 60/486

[51] Int. Cl.² .................. F15B 13/09; F16H 39/46

[58] Field of Search ............ 60/420, 422, 428, 445, 60/447, 449, 484, 486; 91/412

[56] References Cited

UNITED STATES PATENTS

| 3,543,508 | 12/1970 | Schwab | 60/449 |
|---|---|---|---|
| 3,720,059 | 3/1973 | Schurawski et al. | 60/421 |
| 3,963,378 | 6/1976 | McMillan | 60/428 X |

*Primary Examiner*—Edgar W. Geoghegan
*Attorney, Agent, or Firm*—Andrus, Sceales, Starke & Sawall

[57] ABSTRACT

A load sensitive hydraulic circuit for material handling equipment is energized by a prime mover. The hydraulic circuit includes variable displacement pumps coupled to the prime mover and having pressure and flow compensating control means for varying the volumetric output. Each pump is connected to a valve bank which controls various hydraulic actuators of the material handling equipment. Load pressure feedback is provided to the pump compensators for establishing pump flows to operate the actuators at a fixed pressure differential in excess of load pressure. The valve banks contain pressure compensated valves for providing desired fluid flow rates and speeds in the hydraulic actuators. Means are provided to sense reductions in the prime mover speed resulting from excessive hydraulic loads. The means is connected to the pump compensators for simultaneously adjusting the volumetric output of the hydraulic pumps at the preselected pressure differential over the load pressure and power demands on the prime mover so that demands on the prime mover are matched to its available power output.

18 Claims, 4 Drawing Figures

LOAD SENSING HYDRAULIC CIRCUIT HAVING POWER MATCHING MEANS

BACKGROUND OF THE INVENTION
1. Field of the Invention

The present invention is directed to a load sensing hydraulic circuit suitable for being energized by the prime mover of material handling equipment and including means for matching the power output of the prime mover with power demanded by the hydraulic loads on the circuitry.

BACKGROUND
2. Description of the Prior Art

In the past, hydraulic circuits have usually been either of the open center type or the closed center type. The former is characterized by the constant flow rate — variable pressure properties of a fixed displacement pump. The latter is characterized by the constant pressure — variable flow rates of a variable displacement pump. Both are characterized by considerable operating inefficiencies as either the flow rate or pressure provided by the pump is usually greater than that required by the load.

Recently, load sensitive hydraulic circuits have been suggested for sensing the operating condition of the load and providing only the pressure and flow rates necessary to move the load at the desired rate of speed. A typical circuit of this type incorporates a pressure and flow compensated variable displacement pump which is connected to the hydraulic actuator for the load through a pressure compensated, closed center, directional control valve having a variable orifice spool. A pressure feedback signal is provided from the load to the pump.

In operation, the control system for the variable volume pump adjusts the volumetric output of the pump responsive to the pressure feedback signal so as to maintain a constant but low pressure differential between the output pressure of the pump and that existing in the actuator. The output pressure of the pump is controlled so that it exceeds the load pressure existing in the hydraulic actuator by a predetermined differential. The pump thus provides sufficient pressure to drive the actuator and move the load but no more.

The directional control valve in a load sensitive system additionally controls the rate of flow of hydraulic fluid to the actuator by insuring that a constant low pressure drop is maintained across the orifice established in the valve body by the positioning of the valve spool. This constant pressure differential across the orifice provides the flow demand in the hydraulic actuator that is constant for any given valve orifice providing constant speed and ease of control to the actuator. Axial movement of the valve spool varies the orifice and provides the range of flow rates necessary to provide the required range of motor and load speeds.

Load sensitive systems are more efficient than conventional open center and closed center systems and provide longer pump life, good metering, low throttling losses and spool forces. The systems are more complex and expensive than conventional systems and may require particular attention to response times and stability considerations.

However, the load sensitive features of these systems cause power considerations in the circuitry to be initially established with reference to system loads and not by the input power supplied to the circuitry by the driving means for the pump. This driving means is often an internal combustion prime mover, such as a diesel engine. Power demanded from the circuitry by the loads may often exceed power available or supplied to the circuitry by the prime mover. These excessive power demands overload the engine causing a reduction in engine speed. The speed-torque curve of a typical internal combustion engine is such that torque and power decrease with speed causing a degenerative condition in which the engine soon stalls. These conditions are particularly likely to occur in systems having a plurality of pumps and/or valves for actuating a number of loads. The variety and combination of loads applied to such a circuit makes excessive power demands difficult or impossible to predict and control.

If the engine stalls, the operator must relieve the load on the hydraulic circuit, allow the engine to come back up to speed, and then reapply the load. This procedure is disconcerting and inefficient and there is no assurance that the sequence will not shortly thereafter be repeated as the load is reapplied.

SUMMARY OF THE PRESENT INVENTION

The present invention is directed to a prime mover driven hydraulic circuit incorporating both load sensitive features and means for simultaneously correlating the hydraulic power demands placed on the prime mover with its power output. More specifically, the present invention is directed to such hydraulic circuit including means for confining power demands placed on the prime mover to a level corresponding to the power available from the prime mover, thereby to limit reductions in prime mover speed and prevent stalling of the prime mover.

The hydraulic circuit of the present invention includes means for sensing the reduction in prime mover speed resulting from excessive loads on the circuitry and for lessening the volumetric output of the circuitry pump means so that the horsepower demanded by the circuitry is matched to that which the engine is able to supply.

Load sensitivity is obtained by employing pressure compensated variable displacement pump means. Pressure and flow compensated valves are used in the circuitry to provide precise control with infinitely variable flow rates to the load actuators connected to the valves. The circuitry may be used on material handling equipment such as a hydraulic excavator.

The hydraulic circuit of the present invention fully utilizes available engine horsepower, makes most efficient use of the horsepower, and reduces power losses in the circuitry.

DETAILED DESCRIPTION OF THE PREFERRED EMBODIMENT

Material Handling Equipment

Figure 1:
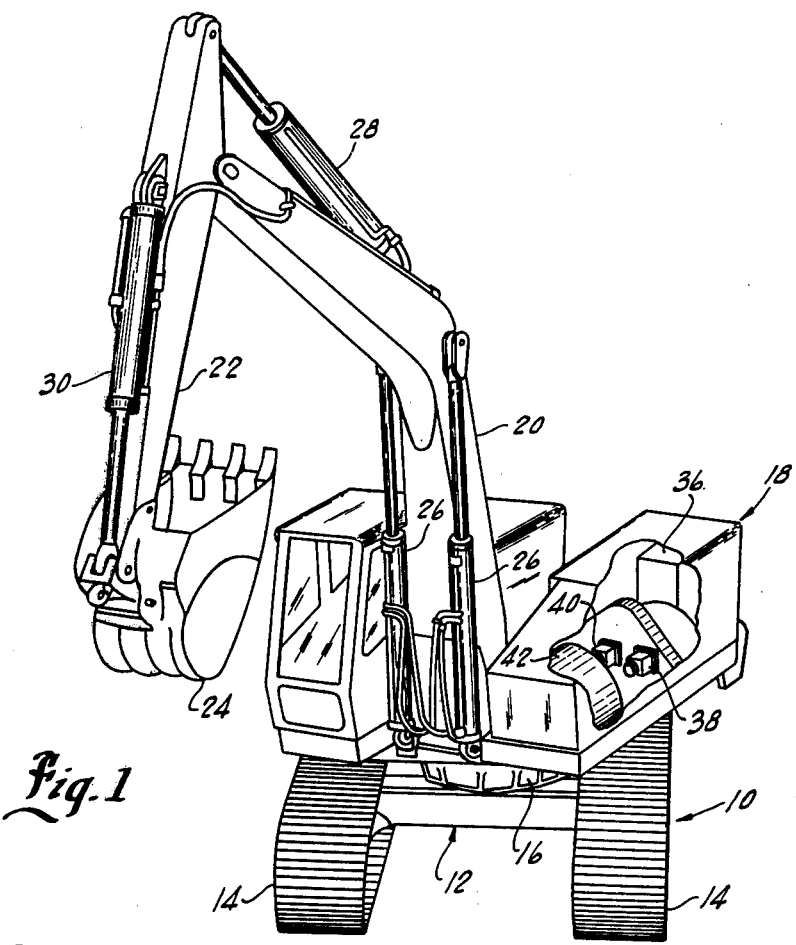
FIG. 1 is a perspective view of material handling equipment incorporating the load sensitive hydraulic circuit of the present invention.

In FIG. 1 there is shown material handling equipment incorporating the load sensitive hydraulic circuit of the present invention. The equipment is exemplarily shown as hydraulic excavator 10. Excavator 10 includes undercarriage 12 containing tracks 14 for providing mobility to the excavator. Undercarriage 12 includes turntable 16 on which superstructure 18 is rotatably mounted. Superstructure 18 includes boom 20, one end of which is pivotally mounted on the superstructure. Stick 22 is pivotally mounted on the other end of boom 20 and bucket 24 is, in turn, pivotally mounted on stick 22. Boom 20 is raised and lowered by hydraulic cylinders 26. Stick 22 is pivoted with respect to boom 20 by hydraulic cylinder 28. Bucket 24 is pivoted with respect to stick 22 by hydraulic cylinder 30. Superstructure 18 is rotated on undercarriage 12 by a hydraulic motor, now shown, coupled to suitable gearing for providing rotation to the superstructure. Tracks 14 are also driven by hydraulic motors.

The hydraulic cylinders and motors are energized by a prime mover, such as diesel engine 36. Engine 36 drives hydraulic pumps 38 and 40 which receive hydraulic fluid from reservoir 42.

HYDRAULIC CIRCUIT

General Construction

Figure 2:
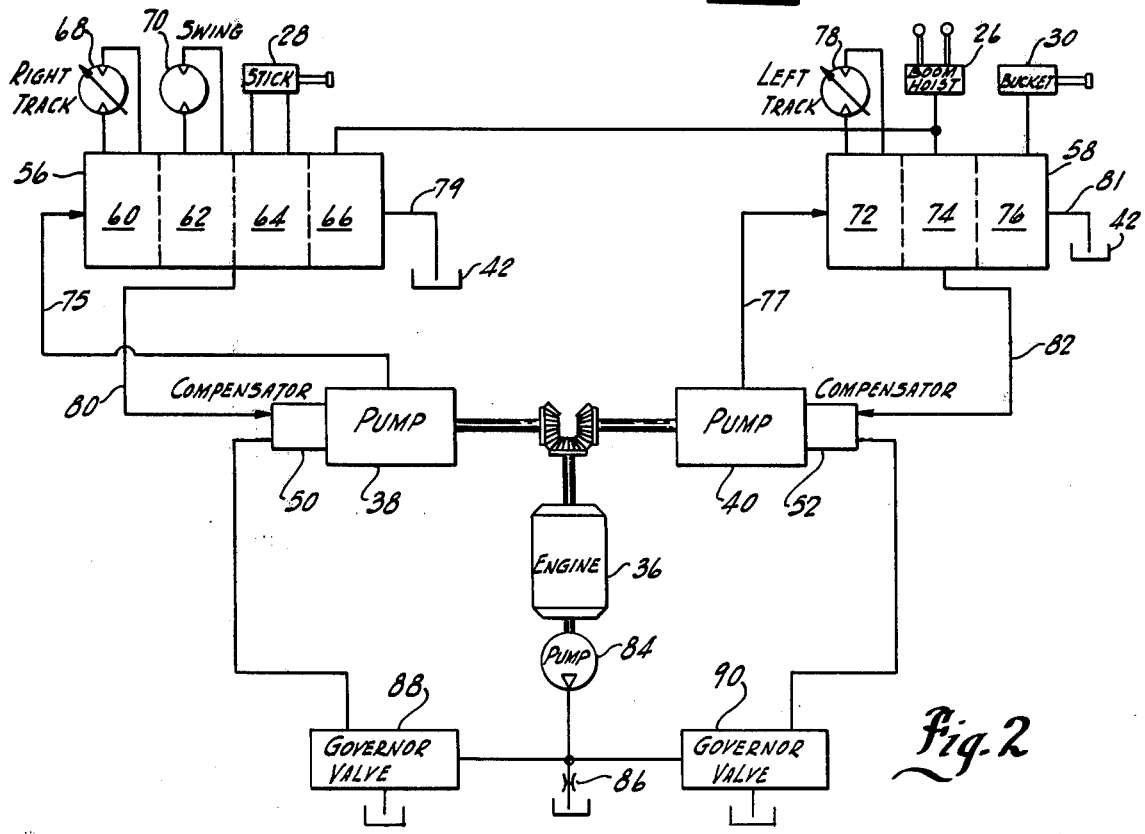
FIG. 2 is a generalized block diagram of the load sensitive hydraulic circuit of the present invention.

The hydraulic circuit for excavator 10 is shown in schematic block form in FIG. 2 to include engine 36 and pumps 38 and 40. Pump 38 and pump 40 are of the variable displacement type having associated therewith compensating means for varying volumetric output of the pump responsive to pilot or feedback signals supplied by various elements of the circuitry to the compensating means. Compensating means 50 and 52 are schematically shown in conjunction with pumps 38 and 40.

Pump 38 is employed to provide hydraulic fluid to valve bank 56 through conduit 75 and pump 40 is employed to provide hydraulic fluid to valve bank 58 through conduit 77. The valve banks include a plurality of valve sections each containing a pressure compensated directional control valve. The valve sections are preferably mounted in a common housing. Valve bank 56 contains valve sections 60, 62, 64, and 66. Valve section 60 in valve bank 56 controls the operation of hydraulic motor 68 connected to one of the tracks 14, for example, the right track, of undercarriage 12. Valve section 62 controls the operation of swing motor 70 which rotates superstructure 18 on undercarriage 12. Valve section 64 controls the operation of hydraulic cylinder 28 which moves stick 22. Valve section 66 provides supplementary quantities of hydraulic fluid to boom hoist cylinders 26 for high speed movement of the boom.

Valve bank 58 contains valve sections 72, 74, and 76. Valve section 72 controls the operation of hydraulic motor 78 driving the left track 14 of undercarriage 12. Valve section 74 controls the operation of boom hoist cylinders 26 which raise and lower boom 20. Valve section 76 controls the operation of hydraulic cylinder 30 which pivots bucket 24 on stick 22.

Valve banks 56 and 58 return hydraulic fluid to hydraulic fluid reservoir 42 in conduits 79 and 81, respectively.

A pressure pilot or feedback signal corresponding to the highest load pressure developed in motors 68 and 70 and cylinders 28 and 26 is provided in conductor 80 from valve bank 56 to pressure compensating means 50 of pump 38. Pressure compensating means 50 controls the volumetric output of the pump so the pressure at the input to valve bank 56 is equal to the pressure of the load plus a predetermined differential pressure. For example, pressure compensating means 50 may maintain the output pressure of pump 38 and the input pressure to valve bank 56 200 psi above the maximum pressure developed in the various loads for the valve bank. A pressure feedback signal is provided in conductor 82 from valve bank 58 to pressure compensating means 52 for providing a similar output pressure differential compensation to valve bank 58.

The hydraulic circuit of the present invention is provided with means for matching the applied hydraulic load to the power supplied by the prime mover by reducing the flow and power demanded by the hydraulic loads on the circuit, thereby to greatly improve the operating efficiency of the circuitry. For this purpose, hydraulic pump 84 is coupled to the output shaft of engine 36. The output of hydraulic pump 84 is passed through orifice 86 to develop a pressure signal which is proportional in magnitude to the speed of the engine. This pressure is provided to governor valves 88 and 90 which are connected to the pressure compensating means 50 and 52 of pumps 38 and 40, respectively. Under conditions in which the sum of the power loads placed on engine 36 is greater than the horsepower output of the engine, the speed of the engine will begin to decrease. This decreases the output pressure provided by hydraulic pump 84, causing governor valves 88 and 90 to operate the pump compensating means to reduce the volumetric output of both pumps to quantities which stabilize or restore engine speed to the desired level while at the same time keeping the output pressure equal to the highest load demand pressure, plus a predetermined differential pressure. The load actuators will act at a slower rate. Horsepower demands will thus match the engine horsepower available at the stablized engine speed. With further decreases in engine speed, the volumetric output of the pumps is further reduced to relieve the engine of all the hydraulic load power demands.

DETAILED CONSTRUCTION

PUMPS

Figure 3A:
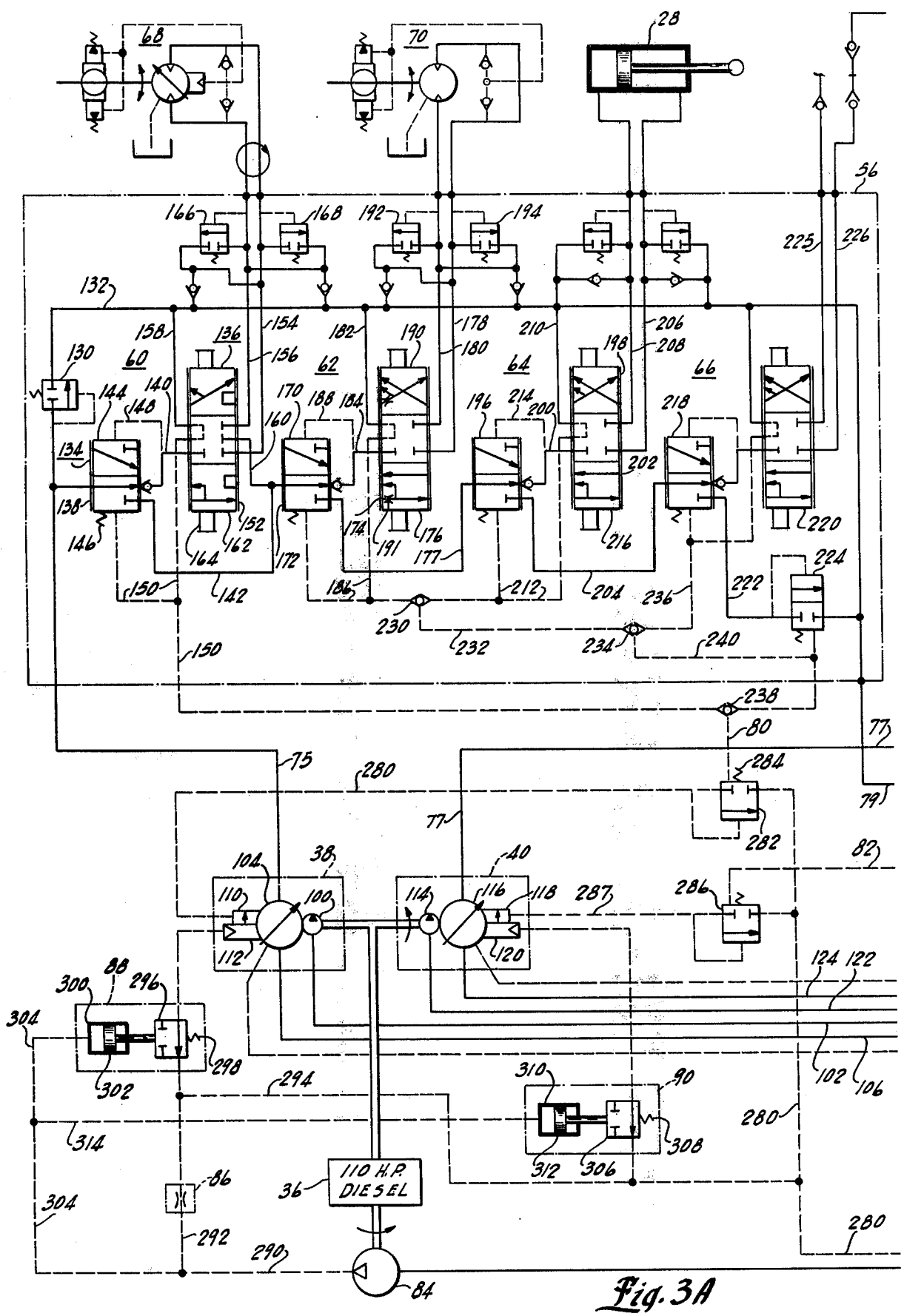
FIGS. 3A and 3B are detailed schematic diagrams of the load sensitive hydraulic circuit of the present invention.

The load sensitive hydraulic circuit of the present invention is shown in detail in FIG. 3A and B. Pump 38 may include constant volume supercharging pump 100 connected to hydraulic fluid reservoir 42 by conductor 102 for pressurizing the hydraulic circuit and making up leakage losses. Variable displacement pump 104 is connected to hydraulic fluid reservoir 42 by conductor 106. The output of pumps 100 and 104 is provided in conduit 75.

Variable displacement pump 104 may typically be an axial piston pump, the volumetric output of which may be varied by varying the position of the cylinder block of the pump. Means 110 is employed for varying the position of the cylinder block and may comprise a hydraulic cylinder the piston of which is biased by a spring. The bias provided by the spring tends to "destroke" the pump and reduce its output. Hydraulic pressures are supplied to the cylinder in opposition to the spring bias so that increasing the hydraulic pressure increases the volumetric output of the pump and decreasing or "venting" the hydraulic pressures reduce the output of the pump. A second means 112 for varying the displacement of pump 104 is also provided. This means may comprise means for providing additional hydraulic pressure to displacement control means 110. It will be appreciated that other types of pumps, such as variable vane and radial piston pumps, may be employed and the function of the spring bias and hydraulic pressures in controlling the output of the pump may be reversed.

Pump 40 may be identical to pump 38 to include fixed volume pump 114, variable volume pump 116 and volume control means 118 and 120. Pump 40 is connected to hydraulic fluid reservoir 42 by conductors 122 and 124 and provides its output in conduit 77.

VALVE BANKS

Conduit 75 of pump 38 is connected to the inlet of valve bank 56. Conduit 79 connects the discharge of value bank 56 to hydraulic fluid reservoir 42. A pressure relief valve 130 may be provided in conduit 132 between the inlet and outlet of valve bank 56. Since the inlet pressures to valve bank 56 are a function of the load pressure there is the possibility that high load pressures could generate excessive inlet pressures. Pressure relief valve 130 provides a limit to the pressures which may be provided to valve bank 56.

It is necessary to establish a system of priorities among the valve sections of valve bank 56 so that the operation of a high priority function may take precedence over lower priority functions and so that the high priority functions will be uneffected by the operation of lower priority functions. For example, if hydraulic motors 68 and 78 are being energized to drive excavator 10 forward, the operation of swing motor 70 or stick hydraulic cylinder 28 must not interfere with the operation of motor 68 or the hydraulic excavator may swerve to one side.

This ordering of priorities is accomplished by connecting the valve sections 60, 62, 64 and 66 controlling the various functions of valve bank 56 in a series or cascaded configuration, commencing with the highest priority function and concluding with the lowest priority function. In valve bank 56, traction motor 68 has the highest priority, then the swing motor 70, then stick hydraulic cylinder 28, and finally the hydraulic boost to hoist cylinders 26. Valve section 60 controlling traction motor 68 having the highest priority is thus connected directly to inlet conduit 75. Valve section 62, having the next highest priority is connected to valve section 60. Valve sections 64 and 66 are connected in a similar manner.

Each of valve sections 60, 62, 64, and 66 consists of a pressure sensitive flow dividing valve and a directional control valve. The valve sections are substantially identical in structure and operation and valve section 60 will be described in detail.

VALVE SECTIONS

Valve section 60 includes a pressure sensitive flow dividing valve 134 and directional control valve 136.

Pressure sensitive flow dividing valve 134 diverts hydraulic fluid not required by valve section 60 for the operation of traction motor 68 to lower priority valve sections 62, 64, or 66. Valve 134 also establishes a fixed pressure drop across directional control valve 136 for providing the metering action of the valve.

As shown in FIG. 3A, pressure sensitive flow dividing valve 134 has a valve body 138 coupled to inlet conduit 75, output conduit 140 and surplus fluid conduit 142. Valve spool 144 in valve body 138 is biased into the position shown in FIG. 3 by spring 146. Output conduit 140 is connected to the inlet port of directional control valve 136. Pilot pressure conduit 148 supplies the pressure in output conduit 140 at the inlet to directional control valve 136 to valve spool 144 in opposition to spring 146. Pilot pressure conduit 150 supplies the pressure at the output of directional control valve 136 to valve spool 144 to assist the pressure of spring 146.

In operation, flow dividing valve 134 regulates the flow of hydraulic fluid through the valve so that the inlet pressure at directional control valve 136 is equal to the output pressure of directional control valve plus a pressure differential equal to the pressure of spring 146. A typical differential pressure may be 50 psi. When excessive fluid is provided through valve 134 to directional control valve 136, the inlet pressure of valve 136 will increase, causing the pressure in pilot conduit 148 to increase, moving valve spool 144 downward and diverting excess fluid into surplus fluid conduit 142 for provision to lower priority valve sections in the series connection of valve sections 60, 62, 64, and 66. In this manner a constant pressure differential is maintained across directional control valve 136.

Directional control valve 136 controls the operation of traction motor 68 which drives the right track 14 of excavator 10. Valve 136 and the corresponding valve in valve bank 58 are of the series type. This insures that equal volume of hydraulic fluid are always available to both tracks. Valve body 152 of valve 136 includes an inlet port connected to diverting valve 134 by conduit 140, control ports connected to conduits 154 and 156 leading to hydraulic traction motor 68, a pilot pressure port connected to pilot pressure conduit 150, a port connected to conduit 132 by conduit 158, and a discharge fluid port connected to conduit 160 and surplus fluid conduit 142 of pressure sensitive flow dividing valve 134.

Valve spool 162 of directional control valve 152 is so constructed as to provide a generally closed center position in which the nominal reservoir pressure in conduits 79 and 132 is provided in pilot pressure conduit 150 to flow dividing valve 134. With valve spool 162 in the center position, the inlet of the valve 136 is blocked causing the pressure in conductor 148 to move valve spool 144 of flow dividing valve 134 to the lower position to divert the flow to the other valve sections.

When valve spool 162 is moved upwardly, as the valve is oriented in FIG. 3A, the inlet port of the valve is opened and connected through the control port to conduit 154. Upon the opening of the inlet port of directional control valve 136 the inlet pressure drops, causing spring 146 to operate flow diverting valve 134 to position valve spool 144 as shown in FIG. 3A, in which position, fluid is provided to the inlet port of directional control valve 136 in conductor 140. This fluid is provided to hydraulic motor 68 to drive the right track 14 of hydraulic excavator 10. The output pressure of directional control valve 136 and hence the pressure in hydraulic motor 68 is provided in conductor 150 to flow dividing valve 134 to operate the valve so as to maintain the predetermined pressure drop across directional control valve 136.

The movement of valve spool 162 to provide communication between the inlet and control ports of the valve establishes an orifice in the flow control elements of the valve. Since the pressure differential across the valve is constant, the rate of fluid flow through an orifice of given size will be constant. The rate of fluid flow and the speed of hydraulic motor 68 is determined by the size of the orifice in valve 136. The size of the orifice is, in turn, controlled by the position of valve spool 162 established by actuator 164.

The fluid return from hydraulic motor 68 is provided in conduit 156. Inasmuch as directional control valve 136 is a series valve, this return is provided through valve 136 and conduit 160 to the next series connected valve section 62.

Crossover relief valves 166 and 168 are provided between circuits 154 and 156 to prevent generation of excessive pressures in hydraulic motor 68.

With valve spool 162 of valve 136 in the lower position, the operation of the valve is similar to that described above except that the fluid supply to hydraulic motor 68 is provided in conduit 156 and returned in conduit 154 to reverse the direction of rotation of hydraulic motor 68.

In valve section 62, the pressure responsive flow dividing valve 170 is similar in construction and operation to flow dividing valve 134 of valve section 60. The inlet port of valve body 172 is connected to conduits 142 and 160 of valve section 60. The outlet port of valve 170 is connected to the inlet port of valve body 174 of directional control valve 176 by conduit 184. The surplus fluid port is connected by conduit 177 to the flow dividing valve in valve section 64, the next valve section in the series priority of valve sections.

Directional control valve 176 is generally similar in construction to the directional control valve 136 in valve section 60. The control ports of valve 176 are connected to conduits 178 and 180 and to hydraulic motor 70 which rotates superstructure 18 of hydraulic excavator 10 on the undercarriage 12. The discharge port of valve 176 is connected via conduit 182, in the conventional manner, to return conduits 132 and 79. The pilot pressure port is alternatively connected to conduit 182 or to the output of valve 176 to provide a pilot pressure to flow dividing valve 170 in conduit 186. The inlet pressure of valve 174 is provided to flow dividing valve 170 through conduit 188.

With valve spool 190 in a raised position, hydraulic fluid is provided in conduit 178 to hydraulic motor 70. A fixed orifice 191 is provided in valve spool 190 between the inlet port and the outlet port so to provide a maximum rate limitation to the speed at which superstructure 18 may be swung. Hydraulic fluid is returned from hydraulic motor 70 in conduit 180 through valve 176 to conduit 182 and to return conduits 132 and 79.

With valve spool 190 in the lowered position, the reverse connection is made to hydraulic motor 70 to drive the hydraulic motor in the opposite direction. Crossover relief valves 192 and 194 are provided between conduits 178 and 180.

Valve section 64 contains pressure sensitive flow dividing valve 196 and directional control valve 198. Flow dividing valve 196 is similar in construction to valves 134 and 170 to include an inlet port connected to conduit 177, an output port connected by conduit 200 to the inlet port of valve body 202 of directional control valve 198 and a surplus fluid conduit 204 connected to the flow dividing valve in the next successive valve section 66. Directional control valve 198 includes control ports connected to conduits 206 and 208, which supply hydraulic cylinder 28 which moves stick 22, a discharge port connected to return conductor 210, and pilot pressure port connected to conduit 212. The directional control valve inlet pressure pilot signal is provided in conduit 214. The valve spool 216 of directional control valve 198 in valve section 64 is similar in construction to the valve pool 190 of valve 176 in valve section 62 except that the fixed orifice is omitted from valve spool 216.

Valve section 66 contains pressure sensitive flow diversion valve 218 and directional control valve 220 and is similar in construction to valve section 64. Inasmuch as valve section 66 is the lowest priority valve in valve bank 56 and the last valve section in the series connection of valve sections 60, 62, 64, and 66 of valve bank 56, the surplus conduit 222 of flow dividing valve 218 is connected through minimal pressure maintaining valve 224 to return conduit 79.

The control ports of directional control valve 220 are connected to hydraulic cylinders 26 which raise and lower boom 20 through conduits 225 and 226, of which only conduit 226 is shown in its entirety. The fluid provided in conduits 225 and 226 increase the rapidity of actuation of hydraulic cylinders 26 and the movement of boom 20.

Figure 3B:
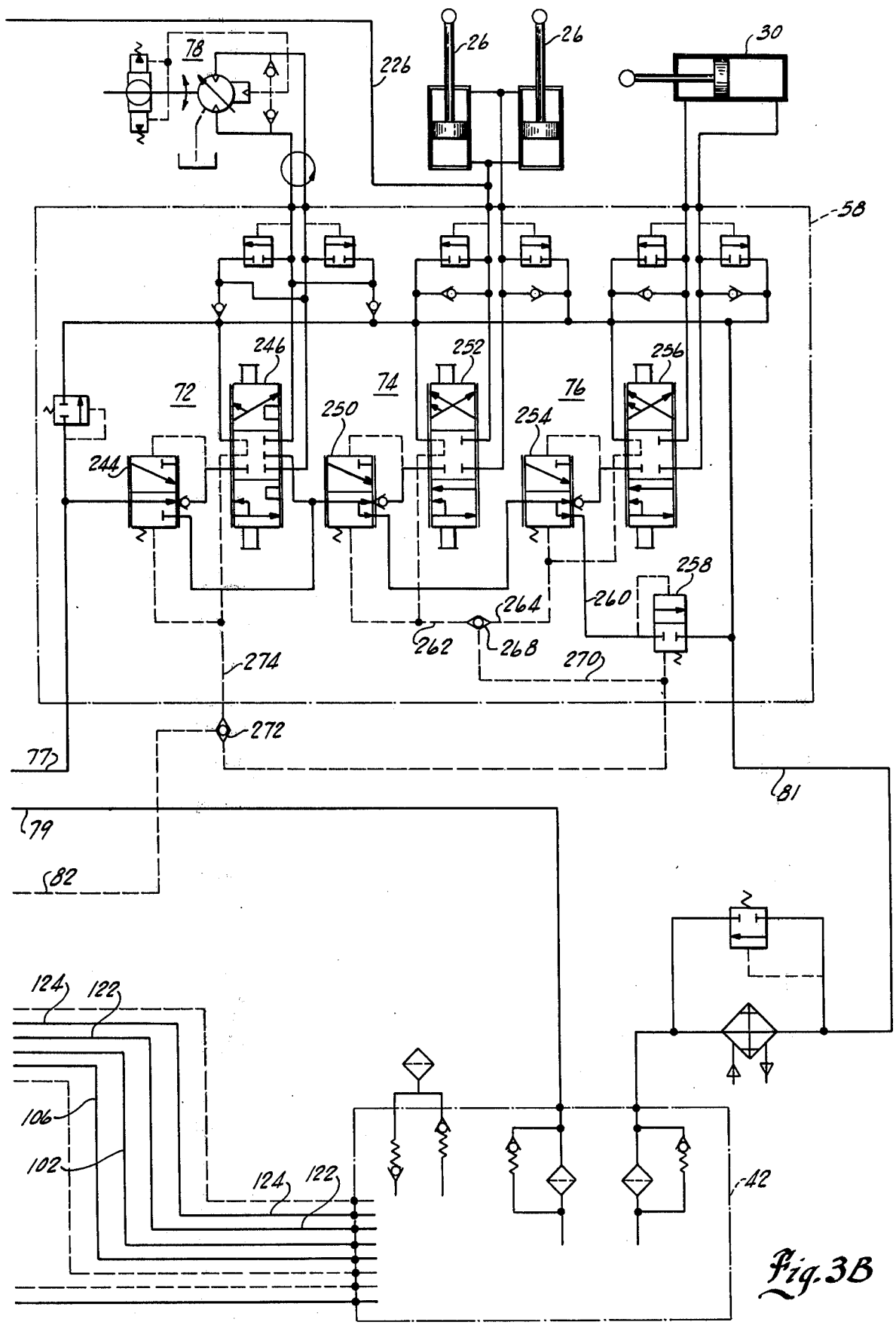

Valve bank 58 shown in FIG. 3B is generally the same as valve bank 56 to include valve sections 72, 74, and 76. Valve section 72, that controls the fluid flow that drives hydraulic motor 78 and the left track of excavator 10, is comprised of pressure sensitive flow diverting valve 244 and series directional control valve 246 and resembles valve section 60 of valve bank 56. Valve unit 74 that controls the fluid flow that operates hydraulic cylinders 26 for raising and lowering boom 20 contains pressure sensitive flow diversion valve 250 and directional control 252. The spool of flow diversion valve 250 is constructed so as to provide a surplus flow passage at all times whether or not the pressure differential across directional control valve 252 is maintained. The same is true of flow diversion valve 254 and directional control valve 256 in valve section 76 that controls the fluid flow that operates hydraulic cylinder 30 and bucket 24. The output of pressure sensitive flow dividing valve 254 is supplied through pressure regulator 258 to conduit 81 and hydraulic fluid reservoir 42.

PRESSURE COMPENSATING SIGNAL NETWORK

In order to operate the compensating means 50 of pump 38 to provide the volumetric output necessary to establish the required pressure differential between load pressure and pump output pressure, a signal indicative of the highest load pressures developed in the actuators controlled by valve bank 56 must be generated and provided to the compensating means. For this purpose the pressure pilot or feedback signal generated in each of the valve sections at the outlet of the directional control valve is supplied to a compensating means control signal generating network. The output pressure signals in valve units 62 and 64 are provided in conduits 186 and 212 to a shuttle valve 230 and a signal corresponding to the greater of the pressures existing in those two valve sections is provided in conduit 232.

The signal in conduit 232 is compared at shuttle valve 234 with the pressure signal in conduit 236 from valve section 66. The output signal from shuttle valve 234 is provided to shuttle valve 238 in conduit 240 and compared with the output pressure signals in conduit 150 from valve section 60. The output signal from shuttle valve 238, which corresponds to the greatest pressure being developed in the hydraulic loads on valve bank 56, is provided in conduit 80 to pressure regulating valve 282 which regulates pressure in the compensator means and, in turn, controls the displacement of pump 38.

In order to provide the signal necessary for operating the compensating means of pump 40, a pilot pressure corresponding to the highest load pressure then being obtained in the loads for valve bank 58 must be generated. For this purpose, the pilot pressure signals in valve sections 74 and 76 are provided in conduits 262 and 264 to shuttle valve 268 and a signal in accordance with the largest pressure existing in those two valve sections provided in conduit 270. The signal in conduit 270 is compared at shuttle valve 272 with the output signal in conduit 274 from valve section 72. The output signal from shuttle valve 272 is provided in conduit 82 to pressure regulating valve 286 which regulates pressure in the compensator means and, in turn, controls the displacement of pump 40.

PUMP COMPENSATING MEANS

The signals in conduits 80 and 82 operate the compensating means for pumps 38 and 40, respectively, which control the volumetric output of the pumps. In the case of pump 38 a hydraulic fluid flow is established in compensating means 110 through conduit 280 to hydraulic fluid reservoir 42. Pressure regulator 282 establishes the pressure in conduit 280 and in compensating means 110 which opposes the spring bias pressure and controls the output of the pump. Pressure regulator 282 is biased into the open, conducting condition by the pressure in conduit 280. Pressure regulator 282 is biased toward the closed condition by the load pressure pilot signal in conduit 80 from valve bank 56. Pressure regulator 282 is further biased toward the closed position by spring 284, the bias force of which is set at the pressure differential desired between the pump output and the hydraulic load pressures. The pressure differential may, for example, be 200 psi.

The operation of pressure regulator 282 will regulate the pressure in conductor 280 to a level equal to the load pilot pressure from valve bank 56 plus the pressure of spring 284. The pressure in conduit 280 operates compensation means 110 and pump 38 to vary the displacement of pump 38 so as to maintain the same pressure condition in output conduit 75.

Pump 40 includes a similar compensating circuit having pressure regulator 286 connected in conduit 287.

HORSEPOWER SUMMATION AND MATCHING MEANS

The horsepower summation means of the present invention includes pump 84 which is connected to the output shaft of prime mover 36 so as to provide an output which is responsive to engine speed. For this purpose a fixed displacement pump the output of which varies in accordance with engine speed may be employed. Pump 84 is connected to hydraulic fluid reservoir 42 through orifice 86 by conduits 290, 292, 294 and 280 to provide a pressure ahead of orifice 86 which is proportional to the speed of engine 36.

Governor valves 88 and 90, operable by the pressure generated by hydraulic pump 84, are generally similar and only governor valve 88 will be described in detail. Governor valve 88 consists of a two way valve 296 which is biased toward the open position by spring 298 and toward the closed position by hydraulic cylinder 300. The output pressure of pump 84 in conduit 290 is provided behind piston 302 of hydraulic cylinder 300 by conduit 304.

The inlet and output ports of two way valve 296 are connected between the additional displacement control mechanism 112 and hydraulic reservoir 42 for controlling the operation of displacement control mechanism 110 by selectively bleeding or venting hydraulic fluid to hydraulic fluid reservoir 42. As the speed of engine 36 decreases, the pressure generated by pump 84 similarly decreases causing displacement control mechanism 112 to reduce the volumetric output of pump 38 and the power demands on engine 36.

Governor valve 90 includes two way valve 306 operable by spring 308 and hydraulic cylinder 310. The input and output ports of two way valve 306 are connected between displacement control means 120 of hydraulic pump 40 and hydraulic fluid reservoir 42. The hydraulic pressure in conduit 290 is provided behind piston 312 of hydraulic cylinder 310 by conduits 304 and 314.

OPERATION

The operation of the load sensitive hydraulic system of the present invention is as follows. It may be assumed that all control valves are in the center or neutral position. At start up, pump 84 coupled to the output of prime mover 36 provides minimal hydraulic pressure in conduits 304 and 314 to governor valves 88 and 90. Springs 298 and 308 bias governor valves 88 and 90, respectively, into the position shown in FIG. 3 to vent the displacement control means 112 and 120 to hydraulic fluid reservoir 42. The displacement control means acts to reduce the volumetric output of pumps 38 and 40. Inasmuch as there is no pilot pressure signal in conduits 80 and 82 from valve banks 56 and 58, respectively, pressure relief valves 282 and 286 are biased to the closed position shown in FIG. 3. While this would ordinarily establish pressures in conduits 280 and 287 which would increase the output of pumps 38 and 40, open governor valves 88 and 90 prevent the establishment of any such pressure. The output of pumps 38 and 40 is minimal.

As prime mover 36 is brought up to speed, pump 84 begins to generate hydraulic pressure in conduits 304 and 314 to governor valves 88 and 90. When the engine attains the desired speed, the pressure in conduits 304 and 314 is sufficient to operate governor valves 88 and 90 to close valves 296 and 306, blocking access to hydraulic fluid reservoir 42. This operates the displacement control means 112 and 120 of hydraulic pumps 38 and 40 to cause the pumps to commence to deliver hydraulic fluid in conduits 75 and 77. With the valve sections of valve banks 56 and 58 in the neutral position, the quantity of fluid is sufficient to make up leakage losses in the hydraulic system. This fluid is provided at a pressure determined by the setting of the pressure regulators 282 and 286 which operate compensator means 110 and 118 for pumps 38 and 40. Starting of engine 36 is facilitated since only several cubic inches per minute of hydraulic fluid at the 200 psi setting of the pressure regulators are provided by pumps 38 and 40.

The functioning of the hydraulic control circuit in operating a single hydraulic actuator may be described in conjunction with the operation of hydraulic cylinder 28 which provides mechanical movement to stick 22 of hydraulic excavator 10. Valve section 64 in valve bank 56 is operated so as to move the valve spool 216 of directional control valve 198 upward, when the valve is oriented as shown in FIG. 3.

Inasmuch as valve sections 60 and 62 of valve bank 56 are in the neutral position, the hydraulic fluid in conduit 75 from pump 38 is provided through pressure sensitive flow dividing valve 134 in valve section 60 and pressure sensitive flow dividing valve 170 in valve section 62 to pressure sensitive flow dividing valve 196 in valve section 64. Valve 196 provides the hydraulic fluid to the inlet port of directional control valve 198. The fluid passes from the inlet port to an outlet port connected to conduit 206 to provide hydraulic fluid to hydraulic cylinder 28. At the same time the pressure generated in hydraulic cylinder 28 is provided to the pilot port and to conduit 212. This pilot signal passes through shuttle valve 230, conduit 232, shuttle valve 234, conduit 240 and shuttle valve 238, and conduit 80 to pressure relief valve 282.

The signal in conductor 80 from valve bank 56 operates pressure relief valve 282 tending to close the valve. This closure raises the pressure in conduit 280 and operates displacement control means 110 to increase the volumetric output of pump 38 until the pressure in output conduit 75 exceeds the pressure in pilot conduit 80 by the predetermined pressure differential. Pressure relief valve 282 thereafter operates to maintain this pressure differential.

If a demand for a higher priority function in valve bank 56 is made the following operation occurs. To operate swing motor 70, valve spool 190 of directional control valve 176 is raised, connecting the inlet port to conduit 178 and hydraulic motor 70. The opening of a passage between the inlet and outlet ports of directional control valve 176 causes a reduction of pressure in pilot conduit 188 which causes pressure responsive flow dividing valve 170 to revert to the position shown in FIG. 3A. In this position, flow dividing valve 170 diverts fluid from surplus conduit 177 to conduit 184 to provide hydraulic fluid to directional control valve 176 to drive swing motor 70. The amount of fluid provided in surplus fluid conduit 177 to flow dividing valve 196 in valve section 64 is reduced by the amount needed to supply hydraulic motor 70.

A pilot signal in accordance with the pressure generated in hydraulic motor 70 is provided in conduit 186 to shuttle valve 230. The greater of the two feedback signals in conduit 186 and conduit 212 is provided through shuttle valve 230 in conduit 232 and ultimately to conduit 80 to control the operation of pressure relief valve 282. Pump 38 delivers sufficient fluid to maintain the required pressure differential over the greatest hydraulic load pressure developed in valve bank 56. In the event more fluid is provided than can be utilized by the valve section controlling the highest pressure load, quantities of fluid in excess of that required by the highest pressure load are passed to valve sections controlling lower priority loads.

The operation of one or more valve sections in valve bank 58 is similar to the operation of valve sections 62 and 64 described above in valve bank 56.

Relief valves 224 and 258 in valve banks 56 and 58, respectively, have a normally closed condition shown in FIGS. 3A and B. This is the mode required in a closed center circuit design with all parallel and priority type valve sections. When series sections are used, such as for traction motors 68 and 78, a passage for fluid returning from the motors must be provided. Shuttle valves 238 and 272 in valve banks 56 and 58 are so arranged that when valve sections 60 and 72 are the only sections in use, no signals from conduits 150 and 274 reach relief valves 224 and 258. Valves 224 and 258 become simple relief valves with a predetermined spring setting.

However, if any other valve sections in the valve banks are operated, load sensing signals are received by valves 224 and 258 through conduits 240 and 270. Since the pilot signals to valves 224 and 258 in conduit 222 and conduit 260 cannot overpower the sum of the load signal in conduits 240 and 270 and the predetermined spring bias, the valves remain closed, as shown in FIGS. 3A and B.

With power demands on the hydraulic circuit being determined by the loads and with the two valve banks 56 and 58 operating essentially independently, it will be appreciated that operating conditions may occur which will place excessive power demands on engine 36. Should these power demands exceed the output power of prime mover 36, the power summation circuit becomes operable. If the sum of the power demands made on engine 36 by both valve banks 56 and 58 become excessive, a reduction in engine speed will result. This reduction in engine speed is sensed by hydraulic pump 84 which lessens the pressure in conduits 304 and 314 to governor valves 88 and 90 and causes the governor valves to open valves 296 and 306 and vent the pump compensators 110 and 112 and pump compensators 118 and 120 to hydraulic fluid reservoir 42. This simultaneously destrokes both pumps 38 and 40 and correspondingly their horsepower consumption. The destroking of pumps 38 and 40 may occur when the reduction in engine speed exceeds a predetermined drop. The reduction in power demands made by pumps 38 and 40 on engine 36 will cause the engine speed to stabilize so that the power output of engine 36 will match the power requirements of pumps 38 and 40. Should the engine speed decrease further, governor valves 88 and 90 will destroke pumps 38 and 40 completely, reducing the output of pumps 38 and 40 to that necessary to make up leakage losses. The excessive load imposed on pumps 38 and 40 must then be removed before operation of the hydraulic circuit may be resumed. A power summation over-ride may be provided to permit the operation of the hydraulic circuit at reduced engine speeds, if necessary.

It will be appreciated that while hydraulic means for limiting the power demands on engine 36 have been exemplarily shown and described above, other means may be employed to the same end. This may include means developing an electrical or mechanical signal proportional to engine speed and utilized in conjunction with electrical or mechanical pump displacement control devices.

Various modes of carrying out the invention are contemplated as being within the scope of the following claims particularly pointing out and distinctly claiming the subject matter which is regarded as the invention.

I claim:

1. A hydraulic circuit for operating a plurality of hydraulic actuators connected to loads, the circuit being powered by a prime mover engine and comprising:

variable displacement hydraulic pump means drivable by the engine;

signal responsive pump displacement control means operatively associated with the hydraulic pump means for controlling the volumetric output of the pump means;

a valve means connected to the pump means and having a plurality of valve sections operatively associated with the hydraulic actuators for controlling flow to energize the actuators to drive the loads;

means coupled to each of the valve sections and to the pump displacement control means for providing a load pressure signal to the displacement control means for causing the latter to adjust the volumetric output from the pump means to a quantity sufficient to provide a pump means output pressure having a preselected pressure differential over the load pressure; and speed sensing means operatively associated with the engine for providing a signal indicative of the engine speed, the speed sensing means being operatively associated with the displacement control means for simultaneously adjusting the volumetric output of the pump means at the preselected pressure differential over the load pressure and the power demand on the engine responsive to a change in engine speed.

2. The hydraulic circuit according to claim 1 wherein the speed sensing means is further defined as means for reducing the volumetric output of the pump means and for limiting power demands on the engine responsive to reductions in engine speed.

3. The hydraulic circuit according to claim 1 wherein the variable displacement hydraulic pump means comprises a plurality of pumps operatively associated with the engine and having signal responsive pump displacement control means, the speed sensing means being operatively associated with the displacement control means for each of the pumps for simultaneously adjusting the volumetric output of the pumps responsive to changes in engine speed.

4. The hydraulic circuit according to claim 3 wherein the pump displacement control means is further defined as responsive to a hydraulic signal and the speed sensing means is further defined as providing a hydraulic signal indicative of engine speed.

5. The hydraulic circuit according to claim 4 wherein the pump displacement control means is responsive to a hydraulic pressure signal and the speed sensing means is further defined as providing a hydraulic pressure signal indicative of engine speed.

6. The hydraulic circuit according to claim 5 wherein the speed sensing means includes a hydraulic pump driven by the engine having an orifice means in the output thereof for providing a hydraulic pressure signal indicative of motor speed.

7. The hydraulic circuit according to claim 3 wherein the valve means is further defined as including valve banks one of which is connected to each of the pumps, said valve banks having a plurality of valve sections, and wherein the load pressure signal means for the valve sections of each of the valve banks is coupled to the displacement control means of the corresponding pump.

8. The hydraulic circuit according to claim 1 wherein the valve sections are further defined as pressure compensated valve sections.

9. The hydraulic circuit according to claim 1 further defined as suitable for use in material handling equipment in which the hydraulic actuators are coupled to movable elements of the material handling equipment.

10. A hydraulic circuit for operating a plurality of hydraulic actuators connected to loads, the circuit being driven by a prime mover engine and comprising:

first and second variable displacement hydraulic pumps coupled to the engine;

first and second signal responsive pump displacement control means operatively associated with the first and second pumps, respectively, for controlling the volumetric output of the pumps;

first and second valve banks connected to the first and second pumps, respectively, each of the valve banks having a plurality of pressure compensated valve sections operatively connected with the hydraulic actuators for energizing the actuators to drive the loads;

means coupled to each of the valve sections and to the pump displacement control means of the corresponding pump for providing a load pressure signal to the displacement control means for adjusting the volumetric output from the pumps to a quantity sufficient to provide a pump output pressure having a preselected differential over the load pressure; and speed sensing means operatively associated with the engine for providing a signal indictive of the engine speed, the speed sensing means being operatively associated with the displacement control means for simultaneously adjusting the volumetric output of both of the pumps at the preselected pressure differential over the load pressure and the power demand on the engine responsive to a change in engine speed.

11. The hydraulic circuit according to claim 7 wherein the pump displacement control means is further defined as responsive to a hydraulic signal and the speed sensing means is further defined as providing a hydraulic signal indicative of engine speed.

12. The hydraulic circuit according to claim 11 wherein the pump displacement control means is responsive to a hydraulic pressure signal and the speed sensing means is further defined as providing a hydraulic pressure signal indicative of engine speed.

13. The hydraulic circuit according to claim 12 wherein the speed sensing means includes a hydraulic pump driven by the engine having an orifice means in the output thereof for providing a hydraulic pressure signal indicative of motor speed.

14. The hydraulic circuit according to claim 10 wherein the speed sensing means is further defined as means for reducing the volumetric output of both of the pumps and for limiting power demands on the engine responsive to reductions in engine speed.

15. The hydraulic circuit according to claim 10 wherein the pump displacement control means is further defined as responsive to a hydraulic signal and the speed sensing means is further defined as providing a hydraulic signal indicative of engine speed.

16. The hydraulic circuit according to claim 15 wherein the pump displacement control means is responsive to a hydraulic pressure signal and the speed sensing means is further defined as providing a hydraulic pressure signal indicative of engine speed.

17. The hydraulic circuit according to claim 16 wherein the speed sensing means includes a hydraulic pump driven by the engine having an orifice means in the output thereof for providing a hydraulic pressure signal indicative of motor speed.

18. The hydraulic circuit according to claim 10 further defined as suitable for use in material handling equipment in which the hydraulic actuators are coupled to movable elements of the material handling equipment.

* * * * *